United States Patent
Doi et al.

(10) Patent No.: US 9,790,041 B2
(45) Date of Patent: Oct. 17, 2017

(54) PAPER FEED ROLLER

(71) Applicant: SUMITOMO RIKO COMPANY LIMITED, Komaki-shi, Aichi (JP)

(72) Inventors: Kuniaki Doi, Komaki (JP); Atsuhiro Kawano, Komaki (JP); Yuma Yoshida, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/136,049

(22) Filed: Apr. 22, 2016

(65) Prior Publication Data

US 2016/0236882 A1 Aug. 18, 2016

Related U.S. Application Data

(63) Continuation of application No. PCT/JP2014/078717, filed on Oct. 29, 2014.

(30) Foreign Application Priority Data

Oct. 30, 2013 (JP) .................................. 2013-225863

(51) Int. Cl.
*B65H 3/06* (2006.01)
*F16C 13/00* (2006.01)
*B65H 5/06* (2006.01)

(52) U.S. Cl.
CPC ............. *B65H 3/0638* (2013.01); *B65H 5/06* (2013.01); *F16C 13/00* (2013.01);
(Continued)

(58) Field of Classification Search
CPC ...... B65H 3/0638; B65H 5/06; B65H 29/125; B65H 29/20; B65H 2511/16;
(Continued)

(56) References Cited

U.S. PATENT DOCUMENTS 7,059,051 B2 * 6/2006 Reich ........................ B24B 1/00
29/895.31
7,703,761 B2 * 4/2010 Shiraki .................... B65H 5/06
271/109

(Continued)

FOREIGN PATENT DOCUMENTS

JP 6-80269 A 3/1994
JP 2001-100549 A 4/2001

(Continued)

OTHER PUBLICATIONS

Notificaton of Transmittal of Translation of the International Preliminary Report on Patentability (Form PCT/IB/338) of International Application No. PCT/JP2014/078717, dated May 6, 2016, with Form PCT/IPEA/409. (5 pages).

(Continued)

*Primary Examiner* — David H Bollinger
(74) *Attorney, Agent, or Firm* — Westerman, Hattori, Daniels & Adrian, LLP

(57) ABSTRACT

A paper feed roller 1 is used in a paper feeding unit in an electrophotographic image forming device. The paper feed roller 1 includes a non-foamed elastic body 2 having an embossed surface 21 including crest-like parts 211 and valley-like parts 212. The embossed surface 21 has many dimple parts 213 recessed inward on bottom surfaces of the valley-like parts 212 or on the bottom surfaces and lateral surfaces of the valley-like parts 212, and does not have the many dimple parts 213 on top parts of the crest-like parts 211. A diameter of the dimple parts 213 can be set to be 1 to 100 μm and an arithmetic average height Ra of the embossed surface 21 to be 3 to 50 μm.

16 Claims, 2 Drawing Sheets

(52) U.S. Cl.
CPC .. *B65H 2404/10* (2013.01); *B65H 2404/5213* (2013.01); *B65H 2511/16* (2013.01); *B65H 2601/2611* (2013.01)

(58) Field of Classification Search
CPC ........ B65H 2404/10; B65H 2404/5213; B65H 2601/2611; B03B 11/18; F16C 13/00; Y10T 29/49561
USPC ..................................... 492/30, 31; 271/109
See application file for complete search history.

(56) References Cited

U.S. PATENT DOCUMENTS

| | | | | |
|---|---|---|---|---|
| 8,561,536 | B2 * | 10/2013 | MacFarlane | B41F 31/26 101/352.11 |
| 8,731,444 | B2 * | 5/2014 | Ohsawa | G03G 15/0818 399/276 |
| 8,991,053 | B2 * | 3/2015 | Watanabe | B05D 5/00 29/895.3 |
| 2002/0115545 | A1 | 8/2002 | Yoshida et al. | |
| 2006/0111223 | A1 * | 5/2006 | Chou | B41J 13/02 492/37 |
| 2013/0209148 | A1 | 8/2013 | Suto et al. | |

FOREIGN PATENT DOCUMENTS

| | | |
|---|---|---|
| JP | 3744337 B2 | 2/2006 |
| JP | 2006-347154 A | 12/2006 |
| JP | 2007-106511 A | 4/2007 |
| JP | 2008-290826 A | 12/2008 |
| JP | 2013-164458 A | 8/2013 |

OTHER PUBLICATIONS

International Search Report dated Dec. 22, 2014, issued in counterpart International Application No. PCT/JP2014/078717 (2 pages).

Office Action dated Mar. 28, 2017, issued in counterpart Chinese Patent Application No. 201480052037.7, with English translation. (8 pages).

* cited by examiner

PAPER FEED ROLLER

TECHNICAL FIELD

The present invention relates to a paper feed roller.

BACKGROUND ART

Conventionally, paper feed rollers have been used for conveying paper in various fields. For example, in an image forming device such as a copying machine and a printer, a paper feeding unit is generally provided to separate and send out paper sheets one by one from a paper sheet cassette containing the paper sheets to an image forming unit. While a paper feeding unit of a pad retarding type (FR type), or of a friction retarding type (FRR type) or the like is conventionally put into practical use, one of the FRR type is often employed because of high reliability in preventing duplicate feed of the paper sheets.

The paper feeding unit of the FRR type has: a picking-up roller which comes into contact with the uppermost part of paper sheets contained in a paper sheet cassette and draws the paper sheet out of the paper sheet cassette with friction force; a feeding roller which sends out the paper sheet drawn out to a paper sheet conveying path; and a retard roller which is brought into press contact with the feeding roller and is stopped or given rotational driving force in the reverse direction to the paper sheet conveying direction via a torque limiter.

The paper feed roller often has a roller surface that undergoes emboss processing and is given a surface roughness based on the embossed surface composed of crest portions and valley portions in order to suppress sticking of paper powder and maintain a coefficient of friction for a long period of time (for example, refer to Patent Document 1).

PRIOR ART DOCUMENT

Patent Document

Patent Document 1: JP-B-3744337

SUMMARY OF THE INVENTION

Problem to be Solved by the Invention

However, the conventional art has room for improvement as follows. Paper with much paper powder such as oversea paper sheets has been widely used in recent years, and causes high request for resistance to sticking of paper powder with respect to the paper feed roller. Nevertheless, the conventional paper feed roller suffers shortage of a volume of the valley portions for allowing the paper powder to escape when the crest portions of the embossed surface are worn away due to long term usage, which problematically causes paper feed failure to arise because of sticking of the paper powder at the top parts of the crest portions and deterioration of the coefficient of friction of the roller surface. In order to prevent this problem, it can be considered that a roughness of the embossed surface on the roller surface is simply made larger. Nevertheless, in such a way, paper powder that has been trapped in the valley portions is liable to fall down at a certain moment and/or portions of the embossed surface are liable to lack.

The present invention is devised in view of the aforementioned background, and has been obtained to provide a paper feed roller hardly causing paper feed failure for a long period of time.

Means for Solving the Problem

One aspect of the present invention provides a paper feed roller for use in a paper feeding unit in an electrophotographic image forming device, the paper feed roller including:

a non-foamed elastic body having an embossed surface including crest portions and valley portions, wherein the embossed surface has many dimple parts recessed inward on bottom surfaces of the valley portions or on the bottom surfaces and a lateral surfaces of the valley portions, and does not have the many dimple parts on top parts of the crest portions.

Effects of the Invention

The paper feed roller has the aforementioned configuration. Hence, even when the crest portions of the embossed surface are worn away due to long term usage, the presence of the dimple parts formed on the bottom surfaces of the valley portions enables a volume for allowing paper powder to escape to be secured. Therefore, in the paper feed roller, paper feed failure hardly arises for a long period of time. Moreover, in the paper feed roller, resistance to sticking of paper powder can be improved with respect to paper with much paper powder such as oversea paper sheets. Hence, endurance is effectively enhanced and a maintenance free feature is effectively achieved, with respect to the paper feeding unit.

MODE FOR CARRYING OUT THE INVENTION

Figure 1:
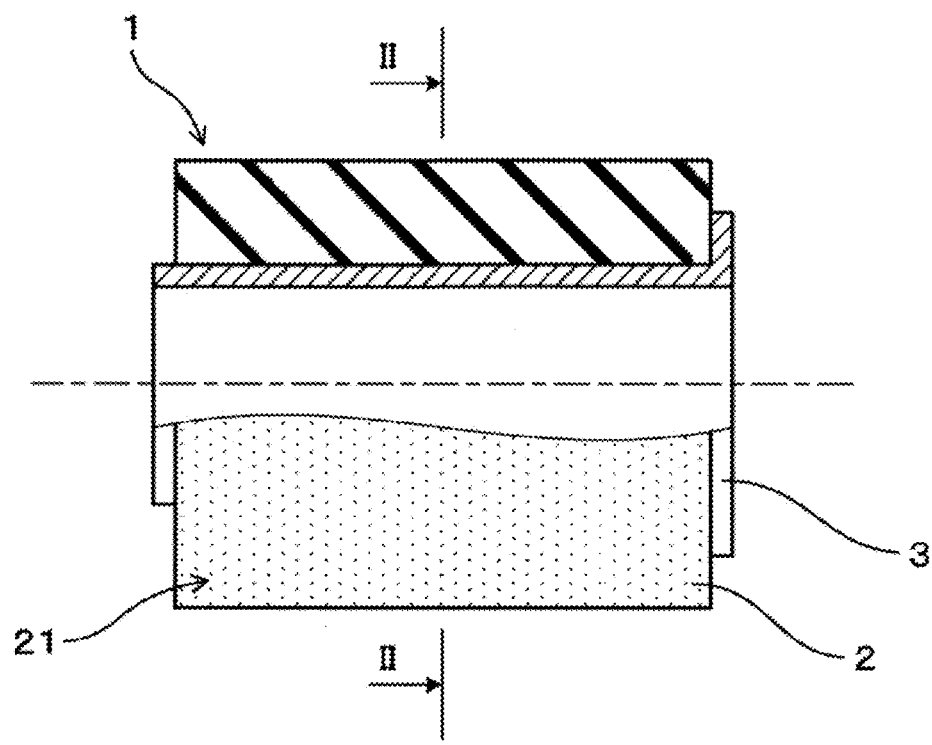
FIG. 1 is a partially cutout schematic explanatory view of a paper feed roller of Embodiment 1.

The paper feed roller has an embossed surface including crest portions and valley portions. Specifically, the embossed surface includes many crest portions and valley portions. In paper feed with the paper feed roller, the top parts of the crest portions come into contact with paper. The valley portions are portions which have smaller heights than those of the crest portions and are interposed by the crest portions which have relatively larger heights. Dimple parts are present on bottom surfaces of the valley portions or on the bottom surfaces and lateral surfaces of the valley portions.

In the paper feed roller, an arithmetic average height Ra of the embossed surface can be set to be within a range of 3 to 50 μm.

In this case, it is advantageous that even when the crest portions are worn away in long term usage, a volume of the valley portions can be relatively easily secured. Moreover, there is also an advantage that defects hardly arise in the embossed surface even in long term usage.

In view of making the trapping effect of paper powder with the valley portions and the dimple parts large, the arithmetic average height Ra of the embossed surface can be set to be preferably 5 µm or more, still preferably 7 µm or more, further preferably 10 µm or more. Moreover, in view of balance between the effects of securing the volume of the valley portions and of suppressing defects of the embossed surface for a long period of time, the arithmetic average height Ra of the embossed surface can be set to be preferably 45 µm or less, still preferably 43 µm or less, further preferably 40 µm or less. Notably, the arithmetic average height Ra is a value which is measured in the roller circumferential direction using a surface texture/contour measuring instrument on the basis of JIS B0601 2001.

In the paper feed roller, a diameter of the dimple parts can be set to be within a range of 1 to 100 µm.

In this case, the effect of formation of the dimple parts in the valley portions can be ensured. Moreover, there can be easily suppressed defects of the embossed surface in long term usage which are due to formation of the dimple parts in the valley portions, which is advantageous for improving endurance.

In view of facilitating to ensure the effect of formation of the dimple parts in the valley portions, the diameter of the dimple parts can be set to be preferably 1.5 µm or more, still preferably 3 µm or more, further preferably 5 µm or more. Moreover, in view of enhancing the effect of suppressing defects of the embossed surface in long term usage, the diameter of the dimple parts can be set to be preferably 80 µm or less, still preferably 60 µm or less, further preferably 40 µm or less. Notably, the diameter of the dimple parts can be measured by, after vertically photographing the embossed surface from the right above with a laser microscope, randomly extracting ten dimple parts to measure the maximum diameters of the individual dimple parts and to obtain the average value.

In the paper feed roller, a ratio of an. area occupied by the dimple parts relative to an area of the valley portions can be set to be within a range of 1 to 25%.

In this case, the effect of formation of the dimple parts in the valley portions can be ensured. Moreover, there can be easily suppressed defects of the embossed surface in long term usage which are due to formation of the dimple parts in the valley portions, which is advantageous for improving endurance.

In view of facilitating to ensure the effect of formation of the dimple parts in the valley portions, the ratio of the area occupied by the dimple parts relative to the area of the valley portions can be set to be preferably 1.5% or more, still preferably 3% or more, further preferably 5% or more. Moreover, in view of enhancing the effect of suppressing defects of the embossed surface in long term usage, the ratio of the area occupied by the dimple parts relative to the area of the valley portions can be set to be preferably 24% or less, still preferably 23% or less, further preferably 22% or less. Notably, the ratio of the area occupied by the dimple parts relative to the area of the valley portions can be obtained by vertically photographing the embossed surface from the right above with a laser microscope (photographing range: 700 µm×50 µm), performing height analysis (binarization), calculating a bottom area of the valley portions, and calculating the area of the dimple parts from the diameters of all the dimple parts present in the bottom surfaces of the valley portions.

In the paper feed roller, the dimple part can be set to have a hemispherical shape.

In this case, since paper powder can easily escape to the dimple part, paper feed failure can be advantageously suppressed.

In the paper feed roller, the dimple part can be set to be a print of a bubble.

In this case, since the dimple part is formed by copying the downward surface of the bubble, there can be achieved a configuration in which the dimple parts relatively uniform are included.

The paper feed roller is used in a paper feeding unit in an electrophotographic image forming device. Specifically, examples of the electrophotographic image forming device can include, for example, a copying machine, a printer, a facsimile, a multifunctional machine, a POD (Print On Demand) machine and the like which employ the electrophotographic type using a charging image. Notably, in this case, the paper feed roller can be applied to various rollers such as the picking-up roller, the feeding roller and the retard roller.

The paper feed roller specifically has an elastic body and has the aforementioned embossed surface on the surface of the elastic body. Examples of a main material composing the elastic body can include, for example, polyurethane, EPDM, silicone rubber and the like. In view of ease of wear resistance and maintaining a coefficient of friction, and the like, the main material composing the elastic: body is preferably polyurethane.

As the polyurethane, there can be specifically used, for example, various thermosetting polyurethanes such as ether-based ones, ester-based ones and caprolactone-based ones. Among these, in view of being hardly hydrolyzed in an environment of use of the paper feed roller, which can lead to contribution to improvement of endurance, ether-based thermosetting polyurethane can be preferably used. The thermosetting polyurethane can specifically contain thermosetting polyurethane rubber (including elastomer).

To the elastic body, there may be added various additives such as a plasticizer, a chain extender, a crosslinking agent, a catalyst, a conductive agent and a colorant.

In the paper feed roller, the elastic body can be formed on an outer circumferential surface of an electrically conductive shaft body such as metal, a resin-made shaft body with electric insulation, or the like, The paper feed roller can be manufactured, for example, as follows. Electric discharge machining is performed with respect to the through hole surface on a molding die having the through hole to form a surface roughness corresponding to the crest portions and the valley portions. Next, a roller forming material is caused to contain fine bubbles, and the through hole of the molding die is filled with the roller forming material containing the bubbles. In this stage, the axial direction is the vertical direction. After that, the molding die is heated to form, from the roller forming material, the paper feed roller which is released from the die, and notably, can be cut into a predetermined dimension as needed.

As above, by transferring the surface roughness of the molding die, there can be formed the embossed surface including the crest portions and the valleyportions. Further, in the valley portions, there can be formed many dimple parts recessed inward as prints obtained by copying the downward portions of the bubbles, positively taking advantage of the bubbles contained in the roller forming material.

In this stage, by changing an air-stirring speed and a stirring time, there can be adjusted an amount of the bubbles caused to be contained in the roller forming material. Moreover, the temperature is adjusted to be low such that the bubbles in the roller forming material with which the molding die is filled do not easily come out, and thereby, the viscosity of the roller forming material can be made high. For example, when the paper feed roller is configured to be made of polyurethane, the aforementioned temperature can be set to be approximately 100° C. or less.

Notably, the aforementioned configurations can be arbitrarily combined as needed for the purpose of obtaining the aforementioned effects and the like or the similar purpose.

Embodiment

Hereafter, a paper feed roller of an embodiment is described using the drawings.

(Embodiment 1)

Figure 2:
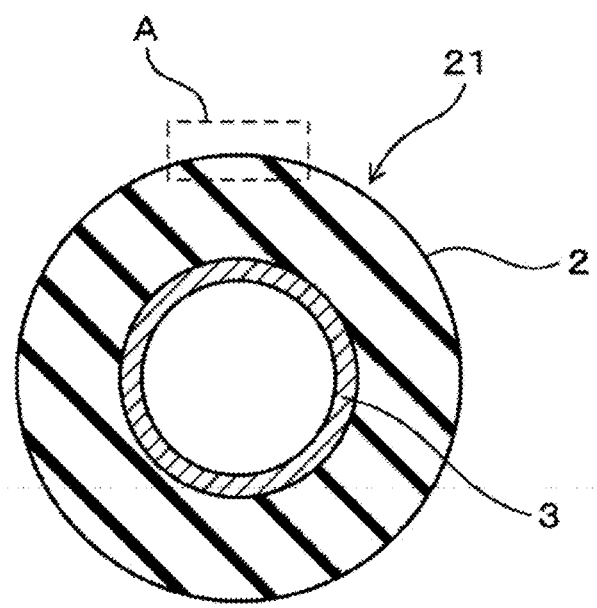
FIG. 2 is a cross-sectional view of the paper feed roller of Embodiment 1 taken along the line II-II.
Figure 3:
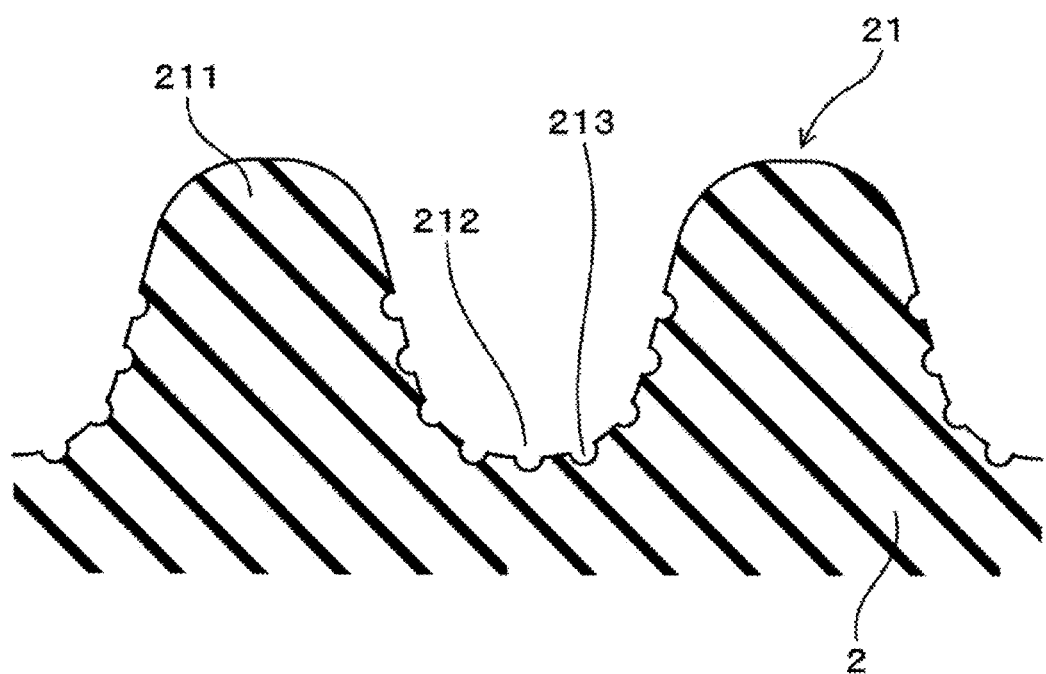
FIG. 3 is a schematically expanded explanatory view of portion A of the roller surface in FIG. 2.

A paper feed roller of Embodiment 1 is described using FIG. 1 to FIG. 3. As illustrated in FIG. 1 to FIG. 3, the paper feed roller 1 of the embodiment has an embossed surface 21 including crest portions 211 and valley portions 212, and has dimple parts 213 recessed inward at least on bottom surfaces of the valley portions 212.

In the embodiment, a paper feed roller 1 specifically has an elastic body 2 exhibiting a cylindrical shape, and has the embossed surface 21 on the surface, of the elastic body 2, which is a roller surface. The elastic body 2 is specifically composed of thermosetting polyurethane. Moreover, the paper feed roller 1 has a resin-made shaft body 3. The shaft body 3 is specifically formed of acetal resin into a cylindrical shape. The elastic body 2 is formed on the outer circumferential surface of the shaft body 3. Notably, into the cylindrical interior of the shaft body 3, there is inserted a metal-made shaft body (not shown) that a paper feeding unit (not shown) in an electrophotographic image forming device includes, so as to deliver rotational driving force.

In the embodiment, the dimple parts 213 are present also on the lateral surface of the valley portion 212 (also corresponding to the lateral surface of the crest portion 211) as well as on the bottom surface of the valley portion 212. It should be noted that the dimple parts 213 are not substantially present at the top part of the crest portion 211. The dimple parts 213 are specifically prints of bubbles having been contained in an elastic body forming material which is a roller forming material, and exhibit hemispherical shapes.

In the embodiment, an arithmetic average height Ra of the embossed surface 21 is set to be within a range of 3 to 50 µm. A diameter of the dimple parts 213 is set to be within a range of 1 to 100 µm. A ratio of an area occupied by the dimple parts 213 relative to an area of the valley portions 212 is set to be within a range of 1 to 25%.

Hereafter, the paper feed roller of the embodiment is further described in detail using Examples.

EXAMPLES (Preparation of Paper Feed Roller Samples)

After there were defoamed and dehydrated 80 pts. mass of polytetramethylene ether glycol (PTMG) ["PTMG2000", Mn=2000, Mitsubishi Chemical Corporation], and 20 pts. mass of polypropylene glycol (PPG) ["Excenol 2020", Mn=5000, Asahi Glass Co. Ltd.] under a vacuum at 80° C. for 1 hour, 32 pts. mass of MDI was mixed to react under a nitrogen atmosphere at 80° C. for 3 hours to prepare urethane prepolymer.

Next, the urethane prepolymer was defoamed under a vacuum at 90° C. for 30 minutes followed by being air-stirred under air-stirring conditions presented in Table 1 mentioned later. After that, in 100 pts. mass of urethane prepolymer, there were blended 30 pts. mass of plasticizer [dioctyl phthalate], 3 pts. mass of chain extender [1,4-butanediol (1,4-BD)], and 2 pts. mass of crosslinking agent [trimethylolpropane (TMP)] to be stirred and mixed under a reduced pressure for 2 minutes, and thereby, each elastic body forming material was prepared which was used for forming the elastic body of the paper feed roller for each of Sample 1 to Sample 18. Each elastic body forming material contained fine bubbles for forming the dimple parts.

Moreover, an elastic body forming material was prepared which was used for forming the elastic body of the paper feed roller for Sample 19 in the similar way except for not performing the aforementioned air-stirring. In other words, this elastic body forming material was not prepared so as to positively contain fine bubbles.

Next, electric discharge machining was performed on a through hole of a molding die which included the through hole having a circular cross section using an electric discharge machine ("DIAX VX10", Mitsubishi Electric Corporation). The electric discharge machining was performed for giving the embossed surface including the crest portions and the valley portions onto the surface of the elastic body to be molded. Notably, by electric discharge control in the aforementioned electric discharge machining, there was adjusted the arithmetic average height Ra of the embossed surface mentioned later.

Next, a core metal was coaxially set into the through hole of the molding die (the axial direction was the vertical direction), the opening parts at both ends were closed with cap dies, and the molding space was filled with the predetermined elastic layer forming material. After that, the molding die was put in an oven to allow the urethane prepolymer to thermoset (at 150° C. for 60 minutes). Thereby, on the outer circumferential surface of the core metal, the elastic body was formed which was composed of the thermosetting polyurethane. After that, the die was removed, and the elastic body was taken off the core metal and cut into a predetermined length. As above, each elastic body was obtained which had the cylindrical shape with φ25 mm of outer diameter, φ16 mm of inner diameter and 24 mm of length. Next, into the cylindrical interior of each elastic body, a cylindrical shaft body was press-fitted which was made of acetal resin. Thus, the paper feed rollers for Sample 1 to Sample 19 were obtained.

(Fine Structure of Roller Surface)

Figure 4:
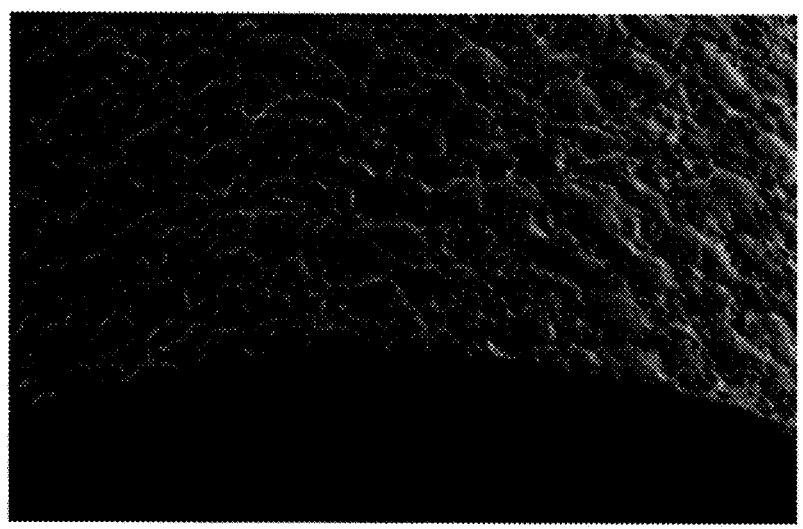
FIG. 4 is a microscope image of the paper feed roller for Sample 4.

The roller surface of the paper feed roller for each sample was observed using a laser microscope ("VK-9500", Keyence Corporation). FIG. 4 presents a microscope image of the paper feed roller for Sample 4 as a representative picture of the paper feed rollers for Sample 1 to Sample 18. As presented in FIG. 4, it is confirmed that each of the paper feed rollers for Sample 1 to Sample 18 has the embossed surface including the crest portions and the valley portions on the elastic body surface which is the roller surface and has the dimple parts recessed inward at least on the bottom surfaces of the valley portions. On the other hand, the paper feed roller for Sample 19 had the embossed surface including the crest portions and the valley portions, but the dimple parts were not observed on the valley portions.

(Arithmetic Average Height Ra of Embossed Surface)

According to the aforementioned measurement method, there was obtained the arithmetic average height Ra of the embossed surface in the paper feed roller for each sample using a surface texture/contour measuring instrument ("Surfcom 1400D", Tokyo Seimitsu Co. Ltd.).

(Details of Dimple Parts)

There were photographed the embossed surfaces in the paper feed rollers for Sample 1 to Sample 18 at a magnification of 400 using a laser microscope ("VK-9500", Keyence Corporation). After that, according to the aforementioned measurement method, there were calculated the diameter of the dimple parts and the ratio of the area occupied by the dimple parts relative to the area of the valley portions.

(Evaluation of Paper Feed Failure)

Each paper feed roller was incorporated in a picking-up part in a paper feeding unit of a commercially available monochrome multifunctional machine ("KM-8030", Kyocera Document Solutions Inc.) to perform an endurance test in which 300,000 paper sheets ("REY", International Paper Company) were caused to pass. In the aforementioned endurance test, "A" was decided as paper feed failure hardly arising for a long period of time when paper sheet conveyance failure due to slippage arose less than five times. Moreover, "B" was decided as being within an allowable range when paper sheet conveyance failure due to slippage arose five to nine times. Moreover, "C" was decided as paper feed failure being not decisive to hardly arise for a long period of time when paper sheet conveyance failure due to slippage arose ten times or more.

Table 1 collectively presents air-stirring conditions, detailed configurations of the dimple parts, evaluation results and the like as to the paper feed rollers for the individual samples.

portions and the valley portions, and further has the dimple parts recessed inward at least on the bottom surfaces of the valley portions. Therefore, for the aforementioned paper feed rollers, paper feed failure hardly arose for a long period of time. This is because even when the crest portions of the embossed surface were worn away due to the long term usage, the presence of the dimple parts formed in the valley portions enabled a volume for allowing paper powder to escape to be secured. Moreover, in the paper feed rollers, resistance to sticking of paper powder can be improved with respect to paper with much paper powder. Hence, it can be seen that endurance is effectively enhanced and a maintenance free feature is effectively achieved with respect to the paper feeding unit in the image forming device.

Moreover, after the aforementioned endurance test, the embossed surfaces of the paper feed rollers for Sample 1 to Sample 18 were observed. As a result, as to the paper feed rollers for Sample 1 to Sample 12 and Sample 16 to Sample 18, defects were not observed on their embossed surfaces. Meanwhile, as to the paper feed roller for Sample 13 in which the diameter of the dimple parts was relatively larger than those of the others, the paper feed roller for Sample 14 in which the area ratio of the dimple parts was relatively larger than those of the others, and the paper feed roller for Sample 15 in which the arithmetic average height Ra of the

TABLE 1

| | Sample | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Air-Stirring Condition | | | | | | | | | | | | | | | | | | | |
| Stirring Speed (rpm) | 200 | 200 | 200 | 200 | 200 | 200 | 400 | 400 | 60 | 60 | 200 | 200 | 30 | 200 | 200 | 200 | 600 | 200 | — |
| Stirring Time (minute) | 90 | 60 | 45 | 30 | 20 | 15 | 90 | 30 | 30 | 15 | 30 | 30 | 30 | 5 | 30 | 120 | 30 | 30 | — |
| Temperature (° C.) | 90 | 90 | 90 | 90 | 90 | 90 | 90 | 90 | 90 | 90 | 90 | 90 | 90 | 90 | 90 | 90 | 90 | 90 | — |
| Arithmetic Average Height Ra of Embossed Surface (μm) | 20 | 20 | 20 | 20 | 20 | 20 | 20 | 20 | 20 | 20 | 3 | 50 | 20 | 20 | 55 | 20 | 20 | 2.6 | 20 |
| Dimple Part | | | | | | | | | | | | | | | | | | | |
| Presence of Dimple Part | Yes | Yes | Yes | Yes | Yes | Yes | Yes | Yes | Yes | Yes | Yes | Yes | Yes | Yes | Yes | Yes | Yes | Yes | No |
| Diameter of Dimple Part (μm) | 20 | 20 | 20 | 20 | 20 | 20 | 1 | 1 | 100 | 100 | 20 | 20 | 150 | 20 | 20 | 20 | 0.5 | 20 | — |
| Area Ratio of Dimple Part (%) | 1 | 5 | 10 | 15 | 20 | 25 | 1 | 15 | 15 | 25 | 15 | 15 | 15 | 50 | 15 | 0.5 | 15 | 15 | — |
| Evaluation of Paper Feed Failure | A | A | A | A | A | A | A | A | A | A | A | A | A | A | A | B | B | B | C |

Based on Table 1, the following facts are apparent. The paper feed roller for Sample 19 has the embossed surface including the crest portions and the valley portions, but does not have the dimple parts recessed inward on the bottom surfaces of the valley portions. Therefore, the paper feed roller for Sample 19 was not able to suppress the paper feed failure for a long period of time. This is because the crest portions of the embossed surface were worn away due to the long term usage, causing shortage of the volume of the valley portions that trapped paper powder, and as a result, the coefficient of friction of the roller surface deteriorated.

On the contrary, each of the paper feed rollers for Sample 1 to Sample 18 has the embossed surface including the crest embossed surface was relatively larger than those of the others, defects were observed on their embossed surfaces.

Based on these results, it can be seen that by setting the diameter of the dimple parts to be 100 μm or less, the area ratio of the dimple parts to be 25% or less, and the arithmetic average height Ra of the embossed surface to be 50 μm or less, not only paper feed failure can be suppressed for a long period of time, but also roller defects can be easily suppressed for a long period of time, which leads to an advantage for improving endurance. Moreover, based on the results of Sample 16 to Sample 18, it is apparent that by setting the diameter of the dimple parts to be 1 μm or more, the area ratio of the dimple parts to be 1% or more, and the arithmetic average height. Ra of the embossed surface to be 3 μm or more, the effect, of suppressing paper feed failure for a long period of time can be ensured.

As above, the embodiment of the present invention has been described in detail. The present invention is not limited to the aforementioned embodiment, various modifications of which can occur without departing from the spirit of the present invention.

The invention claimed is:

1. A paper feed roller for use in a paper feeding unit in an electrophotographic image forming device, the paper feed roller comprising:
    a non-foamed elastic body having an embossed surface including crest portions and valley portions,
    wherein the embossed surface has a plurality of dimple parts recessed inward on a bottom surface of the valley portion or on the bottom surface and a lateral surface of the valley portion, and does not have the plurality of dimple parts on a top part of the crest portion, and
    top ends of the crest portions come into contact with paper, the valley portions are portions for allowing paper powder to escape, and the valley portions are interposed by the crest portions.

2. The paper feed roller according to claim 1, wherein the dimple part is a print of a bubble having been contained in an elastic body forming material for use of forming the elastic body.

3. The paper feed roller according to claim 2, wherein a diameter of the dimple part is within a range of 1 to 100 μm.

4. The paper feed roller according to claim 3, wherein an arithmetic average height Ra of the embossed surface is within a range of 3 to 50 μm.

5. The paper feed roller according to claim 3, wherein the dimple part has a hemispherical shape.

6. The paper feed roller according to claim 4, wherein the dimple part has a hemispherical shape.

7. The paper feed roller according to claim 2, wherein an arithmetic average height Ra of the embossed surface is within a range of 3 to 50 μm.

8. The paper feed roller according to claim 7, wherein the dimple part has a hemispherical shape.

9. The paper feed roller according to claim 2, wherein the dimple part has a hemispherical shape.

10. The paper feed roller according to claim 1, wherein a diameter of the dimple part is within a range of 1 to 100 μm.

11. The paper feed roller according to claim 10, wherein an arithmetic average height Ra of the embossed surface is within a range of 3 to 50 μm.

12. The paper feed roller according to claim 11, wherein the dimple part has a hemispherical shape.

13. The paper feed roller according to claim 10, wherein the dimple part has a hemispherical shape.

14. The paper feed roller according to claim 1, wherein an arithmetic average height Ra of the embossed surface is within a range of 3 to 50 μm.

15. The paper feed roller according to claim 14, wherein the dimple part has a hemispherical shape.

16. The paper feed roller according to claim 1, wherein the dimple part has a hemispherical shape.

* * * * *